June 5, 1956

J. W. GLASER 2,749,455

ELECTRIC RECIPROCATING MOTOR FOR
ANIMATED DISPLAYS AND THE LIKE

Filed April 6, 1953

INVENTOR
JULES W. GLASER

BY *Samuel J Stoll*

ATTORNEY

June 5, 1956
J. W. GLASER
2,749,455
ELECTRIC RECIPROCATING MOTOR FOR
ANIMATED DISPLAYS AND THE LIKE
Filed April 6, 1953
2 Sheets-Sheet 2
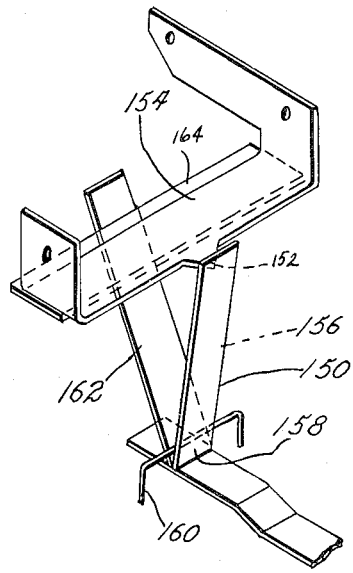
Fig. 5.
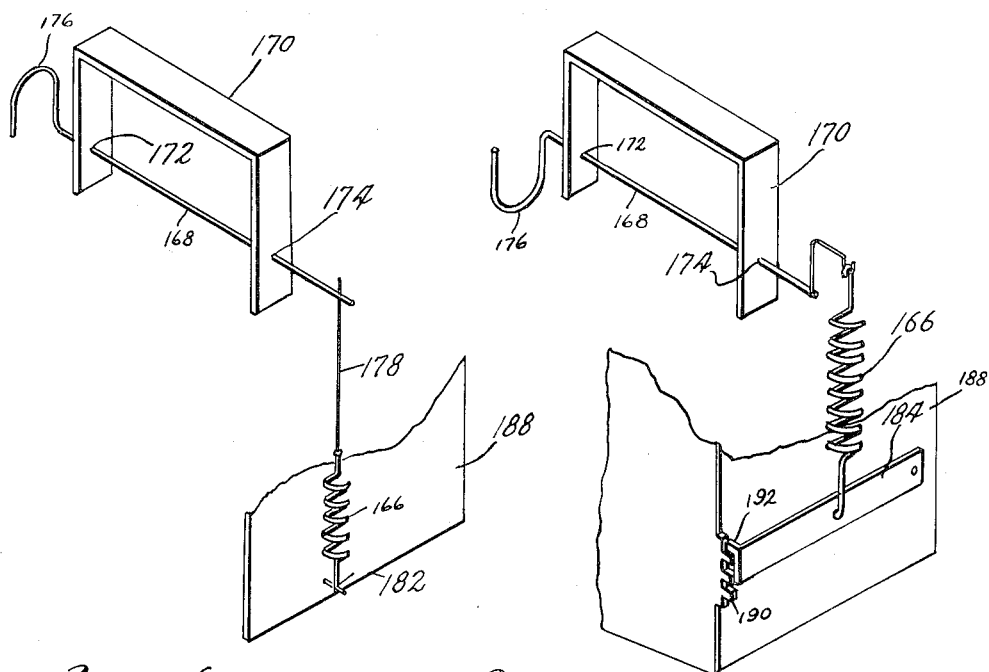
Fig. 6.
Fig. 7.
INVENTOR
JULES W. GLASER
BY
ATTORNEY 2,749,455
Patented June 5, 1956

2,749,455

ELECTRIC RECIPROCATING MOTOR FOR ANIMATED DISPLAYS AND THE LIKE

Jules W. Glaser, Yonkers, N. Y.

Application April 6, 1953, Serial No. 347,028

4 Claims. (Cl. 310—34)

This invention relates to an electric reciprocating motor for animated displays and the like.

Animated displays for advertising, sales and other purposes generally require an electric motor which draws relatively little current. Very frequently a small dry cell of the type used in flash lights is provided as the sole source of electrical energy for a motor of this kind. As a practical matter, it is desirable and even necessary that the motor be so designed that it will operate over relatively long periods of time on the electrical energy which is supplied by a single dry cell of this type.

It has been found that an electric reciprocating motor which is intermittently energized can be made to operate for as long as two months and even longer on a single dry cell, carrying the full load for which it is designed. A motor of this kind requires good balance, a minimum of frictional resistance, and virtually no opposing forces. A pendulum is generally employed to avoid the problem of inertia and also to counter-balance the load as well as to minimize the adverse action of gravity. Extremely important is the type of switch which is employed in connection with the motor. Since the switch must be actuated each time the motor is energized, the switch mechanism should be such as to require a minimum force to operate it.

It is accordingly the principal object of this invention to provide an intermittently energized reciprocating motor of the character described, which is highly efficient both electrically and mechanically, which draws exceedingly little current, which is true in balance, relatively free from friction, provided with a switch which is almost effortlessly actuated, relatively powerful and simple, strong and compact in construction.

This object, with all of the advantages which it seeks to attain, is achieved by the provision of a coil, a permanent bar magnet which is movable along a straight line both into and out of said coil and coaxial therewith, a shaft which is mounted for rotation on its own axis, a pendulum secured to one end of the shaft, an actuating arm at the opposite end of the shaft which may be connected to the movable element of the animated display, a V-shaped switch arm which is mounted for pivotal movement about its apex, and a bell-crank which is fixed intermediate its ends to said shaft, one end of said bell-crank being connected to the magnet and the opposite end being disposed between the arms of the V-shaped switch member, said last mentioned end of the bell-crank being engageable on one side with one of the arms of the switch member to close the circuit to the motor and the other side of said end of the bell-crank being insulated to prevent electrical contact with the opposite arm of said V-shaped switch member.

An important feature of this invention is the construction of the housing which encases the motor and the dry cell which supplies electric current to it. This housing may be made of such inexpensive material as cardboard, die-cut and glued together to form a strong, compact structure. It is light in weight and may very readily be secured to an animated display. It is a low cost construction which provides its own insulation.

It will be understood that some of the component parts of this invention are valuable outside of the combination as a whole which is herein described and claimed. For example, the pivotally mounted V-shaped switch arm is highly useful and suitable wherever there is need for a switch which offers a minimum of physical resistance to the actuating force. When used in conjunction with solenoid coils and permanent magnets, the V-shaped switch can be so arranged with respect to the opening and closing of circuits as to provide for alternate magnetic attraction or alternate magnetic repulsion or either magnetic attraction or repulsion in one half of a cycle and an open circuit with no magnetic influence either way in the other half of the cycle.

Another important feature of the invention is the coil and magnet arrangement wherein the magnet travels in a straight line both into and out of the coil. Still another important feature is the cardboard housing which may be used in conjunction with other forms of reciprocating and rotary motors. The cardboard housing may be made of a single cardboard blank or of more than one blank, suitably folded and held together by glue, staples, rivets, wire stitching or any other form of fastening device suitable for this purpose. In conventional animated displays, a cardboard pocket or receptacle is glued to the back of the display to receive a reciprocating motor or mounting ears or lugs on the motor. Since the housing herein described and claimed is itself made of cardboard, it can be glued directly to the display, thus eliminating one operation entirely, shipping the display preassembled, and affording the opportunity to make minor adjustments due to imperfect alignment or balance before the display is shipped. Furthermore, as has above been indicated, cardboard housing provides its own insulation.

In one preferred form of this invention, counter-balancing is achieved through the use of a pendulum. It will be understood that in some applications of this invention a spring may prove more suitable for counter-balancing purposes than a pendulum, especially where quick action and reaction are desired. The tension of the spring may be adjusted to vary the speed of operation of the motor.

A preferred form of this invention is shown in the accompanying drawing in which:

Fig. 5 is a perspective view of a modified form of switch of the type used herein.

Fig. 6 is a fragmentary perspective view of a modified form of reciprocating motor made in accordance with this invention, but showing the use of an expansion spring instead of a pendulum to counter-balance the load.

Fig. 7 is a similar view of a slightly modified form of reciprocating motor in which a spring serves to counter-balance the load, an adjusting feature being provided for adjusting the tension of the spring and thereby adjusting the speed of operation of the motor.

Figure 1:
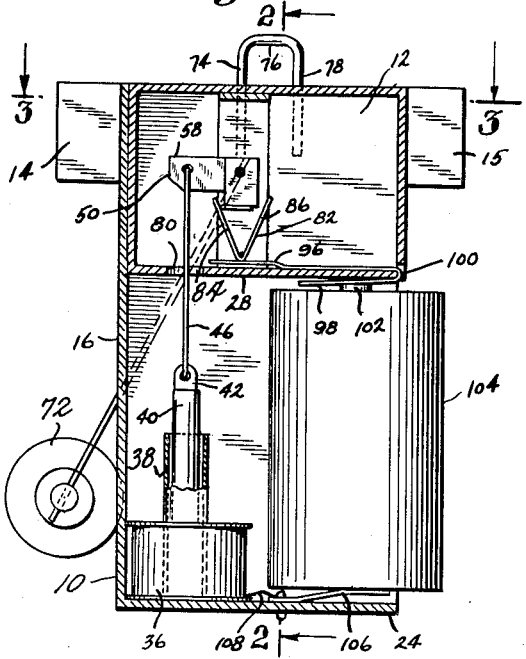
Fig. 1 is a longitudinal section through a reciprocating motor made in accordance with this invention.

Housing 10 is made, preferably, of cardboard which is die-cut and bent and then glued into shape. It has a back wall 12 and a pair of ears 14 and 15 respectively which extend laterally therefrom in opposite directions. These ears may be used to secure the housing to a suitable support, such as the backboard of a conventional animated display. A side wall 16 extends at right angles to the back wall 12 and a front wall 18 extends at right angles to said side wall and in parallel relationship to said back wall. All of these walls and the two ears thus far described are all integral with each other and formed from the same sheet of cardboard.

The top wall 20 is also an extension of the back wall 12 and it is provided with a downwardly extending front portion 22 which abuts the inside of the front wall 18 and is glued thereto. The bottom wall 24 is similarly an extension of the lower end of back wall 12 and said bottom wall is provided with an upwardly extending portion 26 which abuts said front wall 18 and is glued thereto. Front portion 26 has a horizontally extending portion 28 at its upper end which meets the back wall 12 as Fig. 2 clearly shows and is glued thereto. A second sheet of cardboard may be used to form inner back wall 30, inner side wall 32, and outer side wall 34. Inner wall 30 is glued to back wall 12 and inner wall 32 is glued to side wall 16. Outer wall 34 is also secured to front wall 18. This arrangement may be varied as desired since it makes very little difference which of the walls are integral with each other and which are not. In any event, a very strong and rigid construction is clearly provided by this means.

Solenoid coil 36 is mounted on floor 24. Projecting upwardly from said coil and extending inwardly into it is a tubular member 38 which may be made of plastics. This tubular member serves as a guide for permanent magnet 40 to enable said magnet to move in a straight line both into and out of coil 36. When the solenoid coil is energized, it either attracts or repels the magnet depending upon its polarity and the polarity of the magnet. Secured to the upper end of the magnet is an end piece 42 which has a hole formed therein to receive the hooked end 44 of a wire 46. A second hooked end 48 is provided at the opposite end of said wire and it will be seen that it is hooked through a hole in one arm of a bell-crank 50. In the preferred form of this invention the magnet is attracted into the solenoid coil when the latter is energized and when this happens the magnet pulls upon said wire 46 and said wire actuates the bell-crank.

Bell-crank 50 comprises a U-shaped member having a pair of upwardly extending arms 52 and 54 respectively joined at their lower ends by means of a yoke 56. Arm 54 has a lateral extension 58 formed thereon and it is said lateral extension which constitutes one of the arms of the bell-crank and which hook 48 of wire 46 engages.

Arms 52 and 54 are pierced to receive a rod 60 and they are rigidly secured to said rod for integral movement therewith. Rod 60 serves as the operating or torsional shaft of the motor. It projects through holes in the back and front walls of the housing and it is supported by a metal strip 62 which is bent to the shape of an inverted U. The legs of this inverted U-shaped member 62 are identified in the drawing by the reference characters 64 and 66 and they are mounted within cutouts formed in the inner back and front walls 30 and 22 respectively. The yoke 68 of said metal member rests against the top wall 20 of the housing and it is thereby held securely in place. If desired, it may be riveted or otherwise fastened to the front and back walls of the housing.

The legs 64 and 66 of the inverted metal U serve not only as bearings for shaft 60 but also as electrical conductors in the motor circuit hereinafter described. More specifically, only one of these legs need be used for this purpose although both may so be used, if desired.

Affixed to one end of shaft 60 is a wire 70 and supported by said wire is a weight 72. Wire 70 and weight 72 constitute a pendulum which is movable integrally with shaft 60. The opposite end of shaft 60 is bent at right angles to said shaft to form an arm 74. Another portion 76 of said shaft extends at right angles to arm 74 and still another portion 78 extends at right angles to portion 76. Portions 74, 76 and 78 define an inverted U. This inverted U is the connecting means for connecting shaft 60 to the movable part or parts of the display. To an extent, this inverted U counter-balances the pendulum but a better balance is set up between the pendulum on the one hand and said inverted U and the load of the movable part or parts of the display on the other hand. Also taken into account in properly balancing the unit is the weight of magnet 40 and its influence through arm 58 on shaft 60.

Figure 4:
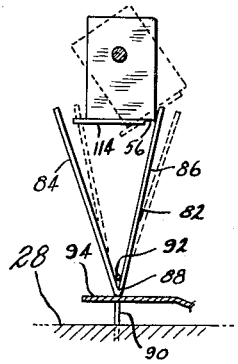
Fig. 4 is an enlarged fragmentary section showing the construction and action of the V-shaped switch arm and the bell-crank which engages it.

It will be noted in Fig. 1 that a hole 80 is provided in shelf or partition 28 to provide clearance for wire 46 which extends from magnet 40 to arm 58 of bell-crank 50. It will further be noted that the magnet and solenoid coil are situated below said shelf and the bell-crank and shaft 60 are situated above the shelf. The switch 82 is also situated above the shelf. It comprises a pivotally mounted V-shaped member consisting of arm 84 and arm 86 joined at their lower ends by means of a relatively sharp yoke or apex 88 and it also includes the yoke 56 of bell-crank 50. A U-shaped staple 90 is driven into shelf 28 and its yoke 92 is disposed between the two arms 84 and 86 of the switch member to hold said switch member in place as is clearly shown in Figs. 2 and 4. The V-shaped switch member is free to rock on its pointed apex as Fig. 4 clearly shows. It will be noted that the yoke or apex of said V-shaped switch member rests on a leaf type of contact member 94 which has an upper arm 96 and a lower arm 98 joined by a yoke 100. This leaf contact member is clipped to shelf 28 as Fig. 1 clearly shows. Leaf member 94 constitutes, to a certain extent, a leaf spring which engages the yoke or apex of the V-shaped switch member and supports it in operative position.

The lower arm 98 of said contact member 94 engages the central terminal 102 of dry cell 104. This dry cell is disposed between bottom wall 24 and intermediate wall or shelf 28 of the housing. It rests upon a leaf spring 106 which is secured to bottom wall 24 and which serves as a contact member relative to the casing of the dry cell. A wire 108 connects leaf spring 106 to one end of solenoid coil 36. Wire 108 may actually constitute one of the two ends of said coil. A second conductor 110 is connected to the opposite end of the solenoid coil or it may constitute the opposite end of said coil. It extends upwardly through a hole 112 in wall or shelf 28 and it is secured to one of the legs of inverted U-shaped member 62.

It will be noted that a piece of insulating material is secured to yoke 56 of bell-crank 50. This piece of insulation extends beyond one of the edges of said yoke but it falls short of the opposite edge thereof. It will be seen that insulation 114 is engageable with arm 84 of the switch member to prevent electrical contact between yoke 56 of bell-crank 50 and said arm 84. The uninsulated edge of yoke 56 is, however, engageable with arm 86 of said switch member to provide electrical contact therewith.

The operation of the above described motor is as follows: When the switch is in its solid line position in Fig. 4, the circuit is closed and the solenoid is energized, thereby attracting the magnet downwardly and turning the bell-crank in counter-clockwise direction as viewed in Fig. 1. Since the bell-crank is fixed to the shaft, the shaft is caused to turn in the same direction and to carry pendulum 70, 72 and end piece 74, 76, 78 along with it. The bell-crank is thereby swung to its dotted line position in Fig. 4 and electrical contact with arm 86 is broken. The solenoid coil is de-energized and the magnet is free to leave said coil. It does leave the coil when the pendulum swings in the opposite direction from that last above mentioned, namely in clockwise direction. This movement of the pendulum causes the bell-crank to swing in clockwise direction and its insulating plate 114 engages switch arm 84 and swings the switch arm in counter-clockwise direction. On the return swing of the pendulum, that is, once again in counter-clockwise direction as viewed in Fig. 1, the bare edge of yoke 56 of the bell-crank will be brought into engagement with arm 86 of the switch member. The circuit is once again completed and the solenoid is once again energized, thereby causing it to attract the magnet and to repeat the process above described. During all this procedure, the V-shaped switch member is free to rock on its apex, first in one direction and then in the opposite direction, depending upon the direction of movement of the bell-crank.

The electric circuit to which reference has above been made comprises the following elements: dry cell 104, contact member 100, V-shaped switch member 82, bell-crank 50, shaft 60, inverted U-shaped member 62, wire 110, coil 36, wire 108 and contact member 106. This circuit is, of course, purely illustrative since the construction above described is operative on other circuits equally as well.

Turning now to Fig. 5, it will be seen that a V-shaped switch 150 is provided which corresponds in all essential respects to the V-shaped switch 82 above described. It possesses, however, the feature of a pointed contact portion 152 on bridge or yoke 154 which is engageable with arm 156 of V-shaped member 158. The V-shaped member 158 is held in place by staple 160 and it pivots freely from side to side in the manner above described. Arm 156 contacts pointed contact portion 152 and excellent conduction is thereby provided. This arrangement also compensates for disalignment in the moving parts of the switch. The opposite arm 162 is engageable, as above described, with insulating member 164.

Figure 2:
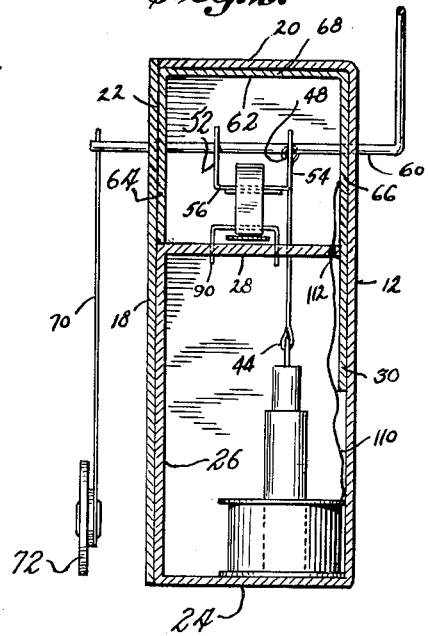
Fig. 2 is another longitudinal section taken on the line 2—2 of Fig. 1.
Figure 3:
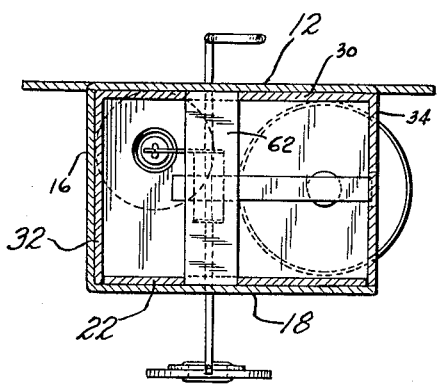
Fig. 3 is a transverse section on the line 3—3 of Fig. 1.

Figs. 2 and 3 show the use of a pendulum to counterbalance the load. Figs. 6 and 7 show the use of an expansion spring 166 to accomplish the same result. Figs. 6 and 7 are somewhat diagrammatic and rod 168 is intended to correspond to rod 60 above mentioned. Inverted U-shaped bracket 170 is intended to correspond to inverted U-shaped bracket 62. Holes 172 and 174 are provided in the legs of bracket 170 to receive rod 168 and to allow said rod to pivot about its own longitudinal axis. One end of rod 168 is provided with a bent portion 176 which may extend either upwardly, as shown in Fig. 6, or downwardly as shown in Fig. 7. In the first case, the load may be located above the axis of rod 168; in the second case, it may be located below said axis. Similarly, in Fig. 6 spring 166 is shown connected to the outer end of rod 168 by means of a vertical rod 178 which extends downwardly from rod 168. In Fig. 7, an upwardly extending inverted L-shaped member 180 is secured to the outer end of rod 168 and it is to the free end of said inverted L-shaped member that spring 166 is attached.

The lower end of spring 166 is secured by means of a pin or rivet 182 to one of the walls of the cardboard housing in the form of invention shown in Fig. 6. In Fig. 7 the lower end of the spring is shown hooked through a hole in a bar 184 which is pivotally secured by means of a pin or rivet 186 to wall 188 of the cardboard housing. Notches 190 are formed in the edge of said wall 188 to receive lug 192 formed at the end of bar 184. It will be seen that by shifting lug 192 from one notch 194 to another, it is possible to adjust the tension of spring 166 and thereby to adjust the speed of the motor.

The foregoing is illustrative of preferred forms of this invention and it will be clearly understood that these preferred forms may be modified and other forms may be provided within the broad spirit of the invention and the broad scope of the claims.

I claim:

1. An electric reciprocating motor for animated displays and the like, comprising a coil, a magnetic plunger mounted for movement into and out of said coil, a rotatably mounted shaft, a pendulum at one end of said shaft, a display actuating arm at the opposite end of the shaft, a contact member mounted adjacent said shaft, an arm on said shaft which is engageable with said contact member, a second arm on said shaft which is linked to said magnetic plunger, a source of electric current, and conductors connecting said source of electric current to said coil and said contact member and additional conductors connecting said coil and said shaft, said contact member constituting a V-shaped element which receives the first arm on said shaft between its own two arms, insulation being provided between the first shaft arm and one of the arms of the V-shaped element to prevent electrical contact therebetween, said first shaft arm being engageable with the second arm of the V-shaped element for electrical contact therewith.

2. A reciprocating motor in accordance with claim 1, wherein the two arms on the shaft comprise a bell-crank which is fixed to said shaft and is movable integrally therewith about the longitudinal axis of said shaft.

3. An electric reciprocating motor for animated displays and the like, comprising a coil, a source of electric current connected to said coil for energizing the same, a switch between said source of electric current and said coil to make and break the circuit therebetween, a magnetic plunger which is mounted for linear movement into and out of said coil and which is attracted into the coil when the coil is energized, a linkage connected to said magnetic plunger for converting the linear movement of said plunger to angular movement, said linkage comprising a rotatably mounted shaft, an arm connected to said shaft and projecting laterally therefrom, and a link connecting said laterally extending arm with said magnetic plunger, a pendulum connected to the shaft of said linkage and opposing the movement of the magnetic plunger into said coil and acting through said linkage to pull the magnetic plunger out of the coil when the coil is de-energized, and means connecting said linkage to said switch, whereby the switch is closed when the linkage is in one angular position and open when the linkage is in other angular positions, the coil being energized when the linkage is in the first of said annular positions and the switch is closed to attract the magnetic plunger and thereby to move the linkage to switch opening position against the action of the pendulum, thereby de-energizing the coil and enabling the pendulum to act through said linkage to draw the magnetic plunger out of said coil, the means which connects the linkage to the switch being an arm which is electrically conductive on one side and insulated against electrical conductivity on the opposite side, said switch comprising a V-shaped conductor which receives said connecting arm between its own two arms, said connecting arm being angularly movable with said linkage to bring its electrically conductive side into engagement with one of the arms of the V-shaped conductor to close the circuit and being angularly movable with said linkage in the opposite direction to bring its insulated side into engagement with the opposite arm of said V-shaped conductor, whereby contact between the conductive side and the first mentioned arm of the V-shaped conductor is broken and the circuit opened.

4. A switch for an electric reciprocating motor and the like, comprising a V-shaped contact member which is pivotally mounted along the line of juncture between its two arms, a second contact member being pivotally mounted between the arms of said V-shaped contact member, and being pivotally movable into engagement with at least one of said arms of the V-shaped contact member, one side of the second contact member being made of electrically conductive material for electrical contact with one of the arms of said V-shaped contact member, the opposite side of said second contact member being insulated to prevent electrical contact with the opposite arm of said V-shaped contact member.

References Cited in the file of this patent

UNITED STATES PATENTS

| | | |
|---|---|---|
| 727,124 | Gillette | May 5, 1903 |
| 2,068,531 | Blume | Jan. 19, 1937 |
| 2,292,179 | Tubbs | Aug. 4, 1942 |
| 2,524,410 | Trainor | Oct. 3, 1950 |
| 2,598,954 | Wengel | June 3, 1952 |

FOREIGN PATENTS

| | | |
|---|---|---|
| 500,035 | Germany | June 16, 1930 |